(12) United States Patent
Weigand

(10) Patent No.: US 6,400,734 B1
(45) Date of Patent: Jun. 4, 2002

(54) METHOD AND ARCHITECTURE FOR TDMA RECEIVER INCORPORATING A UNIQUE WORD CORRELATION CONTROL LOOP

(75) Inventor: David L. Weigand, Sunnyvale, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/206,502

(22) Filed: Dec. 7, 1998

(51) Int. Cl.[7] .......................... H04J 3/06; H04L 27/14; H04L 27/16; H04L 7/00
(52) U.S. Cl. ....................... 370/514; 370/503; 370/509; 370/510; 375/324; 375/363; 375/365; 375/368
(58) Field of Search ................. 370/514, 486, 370/535, 326, 321, 322, 542, 544; 375/260, 340, 347, 349, 365, 364, 368

(56) References Cited

U.S. PATENT DOCUMENTS

| | | | | |
|---|---|---|---|---|
| 4,797,678 A | | 1/1989 | Tsuji et al. ................. 342/352 |
| 5,016,206 A | * | 5/1991 | Shinonaga ............. 364/715.11 |
| 5,231,638 A | * | 7/1993 | Fujiki ......................... 714/765 |
| 5,414,711 A | * | 5/1995 | Okada et al. ................ 371/5.1 |
| 5,524,127 A | * | 6/1996 | Petranovich ................ 375/368 |
| 5,550,833 A | * | 8/1996 | Fujisawa .................. 370/105.4 |
| 5,612,966 A | * | 3/1997 | Lee ............................. 714/814 |
| 5,774,462 A | * | 6/1998 | Ishikawa et al. ............ 370/350 |
| 5,867,490 A | * | 2/1999 | Campanella ................ 370/326 |
| 5,933,053 A | * | 8/1999 | Iemura ....................... 329/311 |
| 6,061,406 A | * | 5/2000 | Carson et al. .............. 375/260 |
| 6,088,411 A | * | 7/2000 | Powierski et al. .......... 375/364 |
| 6,134,286 A | * | 10/2000 | Chennakeshu et al. ..... 375/365 |

* cited by examiner

Primary Examiner—Wellington Chin
Assistant Examiner—M. Phan
(74) Attorney, Agent, or Firm—Skjerven Morrill MacPherson LLP; Philip W. Woo

(57) ABSTRACT

A system includes a unique word correlator module which correlates a unique word field in a burst of a time division multiple access (TDMA) signal against a predefined marker sequence. Automatic timing control circuitry is coupled to the unique word correlator module. The automatic timing control circuitry derives a number of errors that are allowable during correlation of the unique word field.

8 Claims, 7 Drawing Sheets

METHOD AND ARCHITECTURE FOR TDMA RECEIVER INCORPORATING A UNIQUE WORD CORRELATION CONTROL LOOP

CROSS-REFERENCE TO RELATED PATENTS AND APPLICATIONS

This application relates to the subject matter disclosed in the following United States patents and co-pending United States applications:

U.S. Pat. No. 5,598,419 to Weigand et al., entitled "Dynamic Synchronization Code Detection Window;"

U.S. Pat. No. 5,666,366 to Malek et al., entitled "Inter-Base Synchronization Technique For A TDMA Communication System;"

U.S. Pat. No. 5,668,813 to Malek et al., entitled "Dynamic Synchronization Code Detection Window;"

U.S. Pat. No. 5,729,543 to Weigand et al., entitled "Sequencer Employing Conditional Logic In A TDMA Burst Mode Controller;"

U.S. Pat. No. 5,802,076 to Weigand et al., entitled "Audio Error Mitigation Technique For A TDMA Communication System;"

U.S. Pat. No. 5,822,308 to Weigand et al., entitled "Multi-Tasking Sequencer For A TDMA Burst Mode Controller;"

U.S. Pat. No. 5,822,313 to Malek et al., entitled "Seamless Handover In A Cordless TDMA System;" and U.S. application Ser. No. 09/183,567, filed Oct. 30, 1998, entitled "Dynamic Recovery Of A TDMA Signal When Marker Sequence Is Undetected" by Weigand.

The above patents are assigned to the present Assignee and are incorporated herein by reference.

FIELD OF THE INVENTION

This invention relates to time division multiple access (TDMA) communications systems, and in particular, to a method and architecture for a TDMA receiver incorporating a unique word correlation control loop.

BACKGROUND

In a TDMA communications system, a number of transmitters can transmit on the same frequency channel, but at different times. A remote receiver for receiving a particular transmitted signal knows before hand at what approximate time the transmitted signal will occur and is enabled only during that time. Details for such a TDMA communications system are provided in U.S. Pat. No. 5,598,419, which is incorporated by reference herein.

The TDMA technique makes very efficient use of the frequency spectrum since multiple users may use the same radio-frequency (RF) channel at the same time without interfering with one another. FIG. 1 illustrates one type of TDMA system where a plurality of remote portable stations 10, 11, 12, and 13 share a same frequency channel while transmitting to and receiving from a base station 14. The portable stations 10–13 can be, for example, wireless telephones, and the base station 14 can be a high-power transponder base cell. All communications between portable stations 10–13 are routed through base station 14. For communication, each of portable stations 10–13 and base station 14 contains a transceiver which operates in various modes, such as set-up/control mode, transmit/receive mode, data mode, etc.

One embodiment for such a TDMA system is the Personal Handy Phone System (PHS), the requirements for which are described in RCR Standard-28, incorporated herein by reference. As an alternate embodiment, such a TDMA system may be the ETSI DECT standard, also incorporated herein by reference. Further, slow frequency hopping systems, compliant with C.F.R. Title 47, part 15, and intended for the U.S. ISM-bands, may be derived from the aforementioned formal standards.

In a TDMA system, each remote transceiver (e.g., portable stations 10–13), when active, is allocated certain times slots within which it may transmit a bursted signal or receive a bursted signal. FIG. 2 illustrates a frame 16 containing slots 0 through 7, where frame 16 is repeated on a signal frequency channel. The period of frame 16 may be, for example, 5 msecs. Assuming all four portable stations 10–13 in FIG. 1 are being actively used at the same time, portable stations 10, 11, 12, and 13 may be allocated slots 0, 1, 2, and 3, respectively, for transmitting bursted signals to base station 14, while portable stations 10, 11, 12, and 13 may be allocated slots 4, 5, 6, and 7, respectively, for receiving bursted signals from base station 14. The amount of information stored in each of portable stations 10–13 during a frame period is transmitted in a burst within a single slot. In one embodiment, the bit rate of the transmitted bits in a slot is approximately 384K bits per second, and the corresponding symbol rate is, therefore, 192K symbols per second.

A sample protocol 18 which dictates the information required to be transmitted during a single slot is also shown in FIG. 2. Protocol 18 may consist of a ramp-up (R) field 20, a start symbol (SS) field 21, a preamble and/or clock recovery field 22, a unique word or slot synchronization field 23, a data field 24 (typically used as a traffic channel or TCH), a CRC (for error correction and verification) field 25, and a guard bits field 26. The lengths and types of fields in a protocol vary depending on the mode of the transceiver (e.g., set-up/control mode, transmit/receive mode, etc.). While in the traffic mode, where voice is to be transmitted, data field 24 contains audio or voice data.

Modern, digital TDMA communication systems require very accurate synchronization in the time domain. To achieve this, such systems commonly employ a known marker sequence within the TDMA burst architecture. In the case of the conventional TDMA system (such as the PHS) described above, the "unique word" of protocol 18 is used as the marker sequence for each burst. The unique word comprises a predefined sequence of bits and is chosen to have special orthogonal properties which yield a sharp peak during an auto-correlation process performed at a transceiver. When the marker sequence is detected by the transceiver, the transceiver's time-base is re-aligned to the incoming signal. Thus, the transceiver completely re-synchronizes on each frame. Afterwards, the payload data in the burst can be properly recovered.

Generally, a marker sequence is "detected" by comparing and correlating certain bits in a slot or incoming burst of data against the predefined sequence for the unique word. If the bits in the incoming burst exactly match respective bits in the predefined sequence, the unique word is considered to be "detected" for the slot.

However, if environmental conditions (e.g., noise or fading) exist which adversely affect the RF channel, some of the bits within a transmitted signal may be corrupted, thus preventing exact matching of the appropriate bits in a received burst with respective bits in the predefined sequence. To account for this, previously developed TDMA systems allow some error during correlation. In particular, with such systems, a unique word is still considered to be "detected" even though one or more bits in a received signal do not exactly match the respective bits in the predefined sequence. Each un-matched bit constitutes an "error."

With any given previously developed TDMA system, the number of errors allowed during correlation is a pre-set and unchanging value. This inflexibility prevents the system from adjusting with changes in environmental conditions and other factors. That is, the number of allowable errors for near ideal conditions is the same as the number of errors allowed for conditions in which noise or fading adversely affect the RF channel. This is problematic in that a smaller margin of error should be afforded when conditions are ideal, and a greater margin of error should be afforded when conditions are other than ideal.

What is needed is a more flexible technique wherein the number of errors allowed during unique word correlation may be dynamically changed, for example, to account for changes in environmental conditions.

SUMMARY

A method and architecture for a TDMA receiver incorporating a control loop for the correlation of a unique word is provided which substantially improves the detection of unique words and reduces the number of false detections, thereby improving the quality of voice in a TDMA system.

In accordance with an embodiment of the present invention, a TDMA receiver architecture includes a unique word correlators control loop. The unique word correlators control loop is programmable and controls or adjusts of the number of errors allowed during correlation of the unique word. For a given frame, the number of allowable correlation errors can be set based upon various parameters, including, for example, received signal strength indicator (RSSI) level, preamble detection, CRC detection, timebase status, channel type, communication burst type, and unique word correlation result for the current frame or a previous frame.

PHS utilizes four different unique words to achieve time synchronization in the TDMA system. Specifically, two 32-bit unique words may be provided for control channel synchronization, and two 16-bit unique words may be provided for communication channel synchronization. For each channel type (control or communication), one of the respective unique words is used for uplink (i.e., transmission from portable station to base station), and the other unique word is used for downlink (i.e., transmission from base station to portable station). The automatic unique word detection mechanism described herein works on all four unique words.

According to one embodiment of the present invention, a system includes a unique word correlator module which correlates a unique word field in a burst of a time division multiple access (TDMA) signal against a predefined sequence. Automatic timing control circuitry is coupled to the unique word correlator module. The automatic timing control circuitry derives a number of errors that are allowable during correlation of the unique word field.

According to another embodiment of the present invention, a method includes the following steps: receiving a burst of a time division multiple access (TDMA) signal, the burst having a unique word field; correlating the unique word field against a predefined sequence; and deriving a number of errors that are allowable during correlation of the unique word field.

An important technical advantage of the present invention includes dynamically changing the number of allowable errors for correlation of a unique word in order to adjust for changing conditions. Accordingly, the present invention improves the quality of voice communication in a TDMA system, thereby promoting customer satisfaction and loyalty for a provider. Other important technical advantages are readily apparent to one skilled in the art from the following figures, descriptions, and claims.

BRIEF DESCRIPTION OF THE DRAWINGS

For a more complete understanding of the present invention and for further features and advantages, reference is now made to the following description, taken in conjunction with the accompanying drawings, in which.

DETAILED DESCRIPTION OF THE PREFERRED EMBODIMENTS

The preferred embodiments of the present invention and their advantages are best understood by referring to FIGS. 3–9 of the drawings. In the various drawings, like numerals are used for like and corresponding parts.

TDMA Transceiver Architecture

Figure 1:
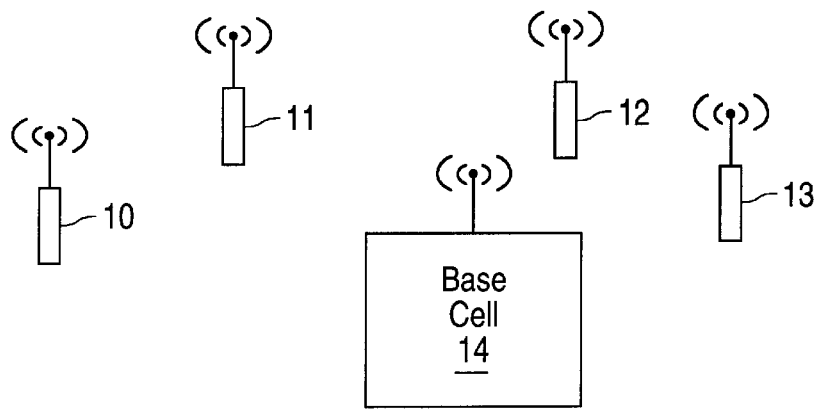
FIG. 1 illustrates a base station and portable stations in a conventional TDMA system.
Figure 3:
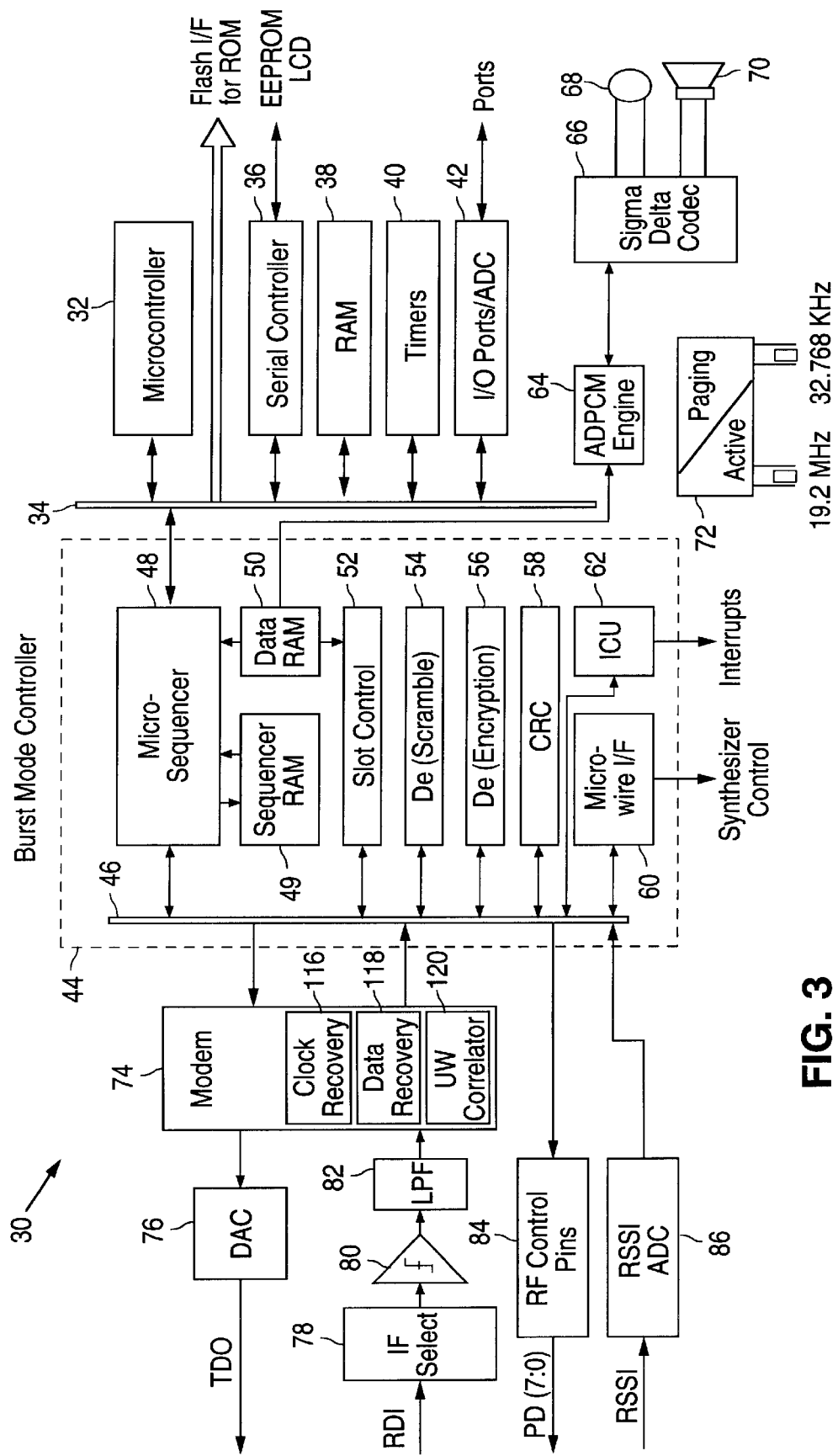
FIG. 3 illustrates the basic architecture for a preferred embodiment TDMA system transceiver.

FIG. 3 illustrates a preferred embodiment for a TDMA transceiver 30 in which the number of errors allowed during unique word correlation can be changed in response to various parameters including, but not limited to, RSSI level, preamble detection, timebase status, CRC result, channel type, communication burst type, and unique word correlation result for the current frame or a previous frame, thereby adjusting for changes in environmental conditions. This transceiver 30 may be used in a TDMA system such as shown in FIG. 1, for example, by incorporation into any one or more of portable stations 10–13.

As shown, transceiver 30 includes a microcontroller 32. Microcontroller 32 can be a compact, reduced instruction set computing (RISC) microcontroller, such as a Model CR-16 from National Semiconductor Corporation. A system bus 34 connects microcontroller 32 to a serial controller 36, a random access memory (RAM) 38, one or more timers 40, and one or more input/output (I/O) ports and analog-to-digital converters (ADCs) 42. Serial controller 36 can be coupled to an electrically erasable programmable read-only memory (EEPROM) liquid crystal display (LCD) for control thereof. RAM 38 is used for storing various information, such as program variables, mailbox information, and stack parameters. System bus 34 also functions to connect transceiver 30 to a flash interface (I/F) for program store.

A burst mode controller (BMC) 44 is connected to system bus 34. In general, BMC 44 creates the various slots for transmission of data and controls the timing of the information within each of the slots. Furthermore, BMC 44 operates upon data received and transmitted by TDMA transceiver 30. BMC 44 includes a BMC bus 46 connected to system bus 34 via a micro-sequencer 48.

Micro-sequencer 48 builds the slots for transmission at synchronized times. In addition, micro-sequencer 48 controls the overall bit synchronization for each slot. For example, in one embodiment, micro-sequencer 48 issues multi-bit control flow signals in order to build the slots within a frame and ensure the bits within the slots are synchronized with a base station transceiver. Furthermore, micro-sequencer 48 may initiate, execute, run, and/or otherwise control a receive (RX) slot control routine which operates on a bursted signal received at transceiver 30. The slot control routine manages the reception and processing of the received bursted signal, on a slot-by-slot basis, to recover data, such as speech (or voice) data, user packet data, or control data carried as a payload therein. Micro-sequencer 48 can also generate or output signals for controlling an RF deck. Micro-sequencer 48 is described below in more detail.

A sequencer RAM 49 and a data RAM 50 are connected to micro-sequencer 48. Sequencer RAM 49 stores microcode/instructions for micro-sequencer 49. Data RAM 50 stores certain protocol bits and data bits which will be called upon during operation of TDMA transceiver 30 to build a slot for transmission and for reception. Some of these protocol and data bits can be inserted into a slot. Data RAM 50 functions to store voice data for a previous frame; such previous voice data can be replayed as part of an error mitigation protocol which is run when voice data for a current frame cannot be recovered. Access to data RAM 50 can be controlled by micro-sequencer 48.

Slot control 52, scramble/descramble engine 54, encryption/de-encryption engine 56, CRC engine 58, and a unique word (UW) correlator module (described below) are connected to BMC bus 46. Slot control 52 and the above engines 54–58 generally perform baseband processing. These elements may operate upon payload data received at, or to be transmitted out of, TDMA transceiver 30. For example, for a received signal, slot control 52, scramble/descramble engine 54, encryption/de-encryption engine 56, CRC engine 58, and the UW correlator module may operate upon a payload field containing a traffic channel (TCH) or VOX logical channel (explained below) to recover the speech data carried therein.

Furthermore, when a marker sequence is not detected for a received bursted signal, CRC engine 58 may load a predetermined bit pattern into a channel identifier (CI) field of the signal to indicate that the payload field contains voice data, whether or not voice data is actually contained therein. If the payload field does indeed contain voice data, the loading of the predetermined bit pattern into the CI field allows the data to be recovered. On the other hand, if the payload does not actually contain voice data, this fact may be revealed by using the CRC field of the received signal as an error detecting mechanism. In one embodiment, CRC engine 58 can be implemented using a linear feedback shift register (LFSR). This technique is used to recover payload data when the unique word is undetected, and is described in more detail in U.S. patent application Ser. No. 09/183, 567, entitled "Dynamic Recovery Of A TDMA Signal When Marker Sequence Is Undetected," which is incorporated herein by reference.

A micro-wire interface (I/F) 60 and an interrupt control unit (ICU) 62 are also connected to BMC bus 46. Micro-wire I/F 60 is a serial device. Micro-wire I/F 60 interfaces with and controls at least one RF phase lock loop (PLL). In one embodiment, micro-wire I/F 60 loads a PLL synthesizer in the RF deck. ICU 62 generates interrupt signals, some of which can be used to interrupt microcontroller 32.

An adaptive-differential pulse code modulated (ADPCM) engine 64 is connected to micro-sequencer 48 and operates under control of BMC 44. ADPCM engine 64 provides encoding and decoding of pulse code modulated (PCM) audio data for the data field in a slot. ADPCM engine 64 may also perform or support an error mitigation protocol whereby voice data for a previous frame is repeated if voice data for a current frame cannot be recovered. A sigma delta codec module 66 interacts with ADPCM engine 64 to convert bits of audio information into an audio signal, and vice versa. Sigma delta codec may be implemented using a digital signal processor, an analog-to-digital converter, a digital-to-analog converter, and other suitable circuitry. A microphone 68 and speaker 70 are connected to sigma delta codec module 66 for receiving and outputting, respectively, the audio signal.

An active/paging oscillator module 72 is connected throughout TDMA transceiver 30 and functions as a system clock. Active/paging oscillator module 72 includes a free-running, internal clock, such as, for example, one formed with a piezoelectric crystal. Active/paging oscillator module 72 may run at different frequencies depending the mode of operation for TDMA transceiver 30. For example, in one embodiment, active/paging oscillator module 72 may operate at a super-high frequency (such as 19.2 MHz) for an active mode of transceiver 30 and at a low frequency (such as 32.768 kHz) for a paging mode of transceiver 30. Thus, in paging mode, active/paging oscillator module 72 uses a relatively small amount of power; in active mode, this module uses a large amount of power.

A modem 74 is coupled to BMC 44. Modem 74 generally functions to modulate and demodulate various signals transmitted out of and received by TDMA transceiver 30. For example, modem 74 may receive a bitstream from BMC 44 and operate upon the same to generate a digitally formatted signal for transmission out of transceiver 30. Further, modem 74 may operate upon various signals received at TDMA transceiver 30 to recover a bitstream for input to BMC 44. Modem 74 includes a clock recovery module 116, a data recovery module 118, and a unique word (UW) correlator module, which is incorporated into a UW correlator control loop, as described in detail below.

A digital-to-analog converter (DAC) 76 is coupled to modem 74. DAC 76 receives the digitally-formatted data and information signals generated by modem 74 and converts the same into an analog format. This analog data is then output by DAC 76 in a transmit data out (TDO) signal.

Figure 6:
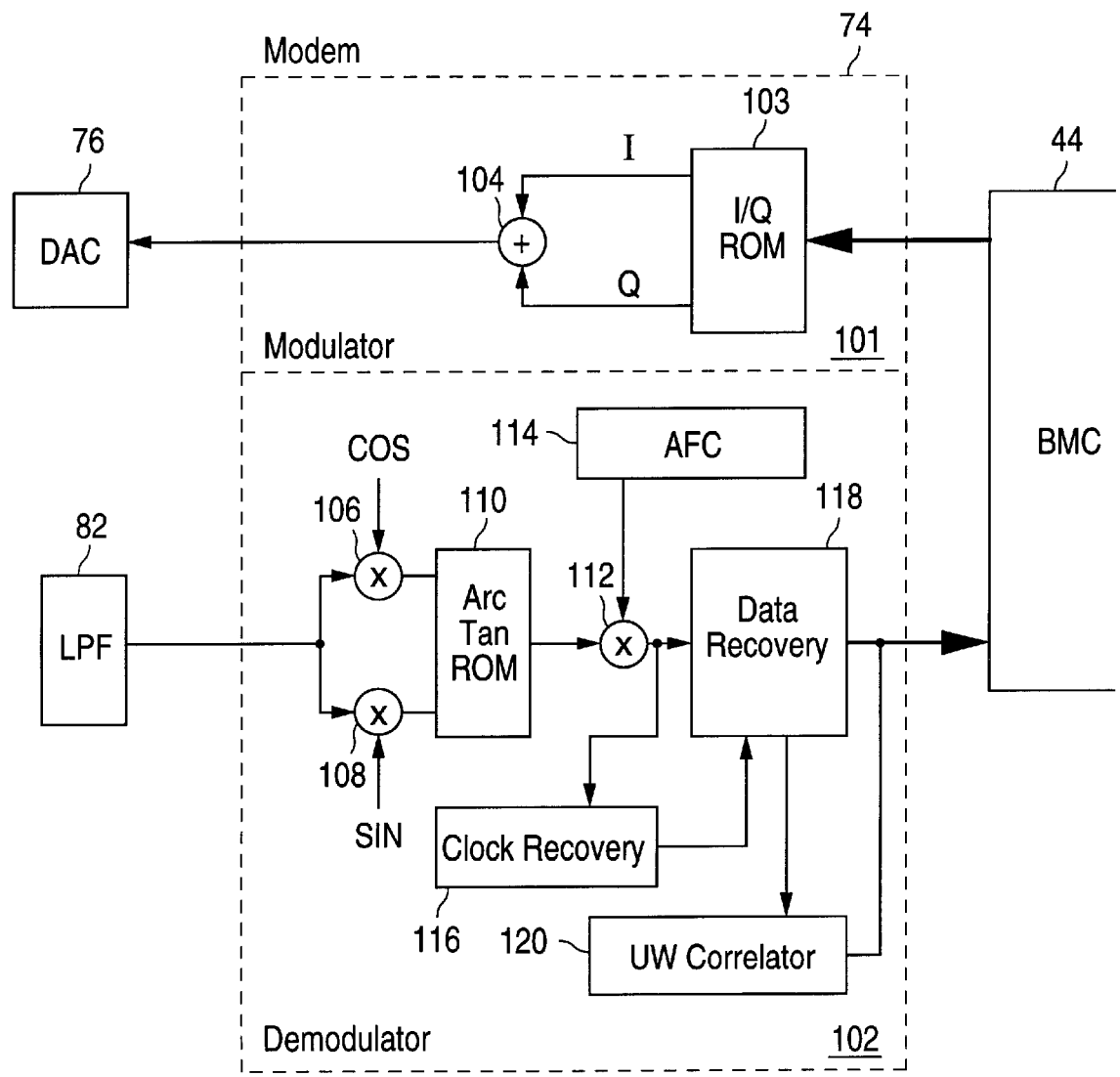
FIG. 6 shows additional details of a modem used in a preferred embodiment.

An intermediate frequency (IF) select module 78, a comparator 80, and a low pass filter (LPF) module 82 are connected in sequence to modem 74 for receiving and initially processing data in a receive data in (RDI) signal. IF select 78 allows the selection of one of a plurality of suitable frequencies for use as an intermediate frequency when processing the RDI signal. In one embodiment, these frequencies include 1.2 MHz and 10.8 MHz. Comparator 80 receives the output of IF select 78. Comparator 80 operates on a baseband bitstream which can then be operated upon by engines 52–56 and the UW correlator module (FIG. 6). LPF module 82 performs a low pass filter operation on the signal output by comparator 80.

One or more radio frequency (RF) power-down control pins 84 are connected to BMC 44 for outputting eight power-down (PD) signals to various external devices. For example, RF power-down control pins 84 may be coupled to an RF deck, which can include a power amplifier (PA), phase lock loop (PLL), voltage-controlled oscillator (VCO), and transmit/receive (TX/RX) components. The control signals output to the RF deck can include signals for transmit/receive, power-down, antenna steering, or received signal strength indicator (RSSI) capture.

An RSSI analog-to-digital converter (ADC) 86 receives an RSSI signal which indicates the strength of the RDI signal. The RSSI signal reflects the effects of various adverse environmental conditions, such as noise or fading, on the RDI signal. RSSI ADC 86 relays the RSSI signal to BMC 44, to which RSSI ADC 86 is coupled.

Protocol

Figure 4:
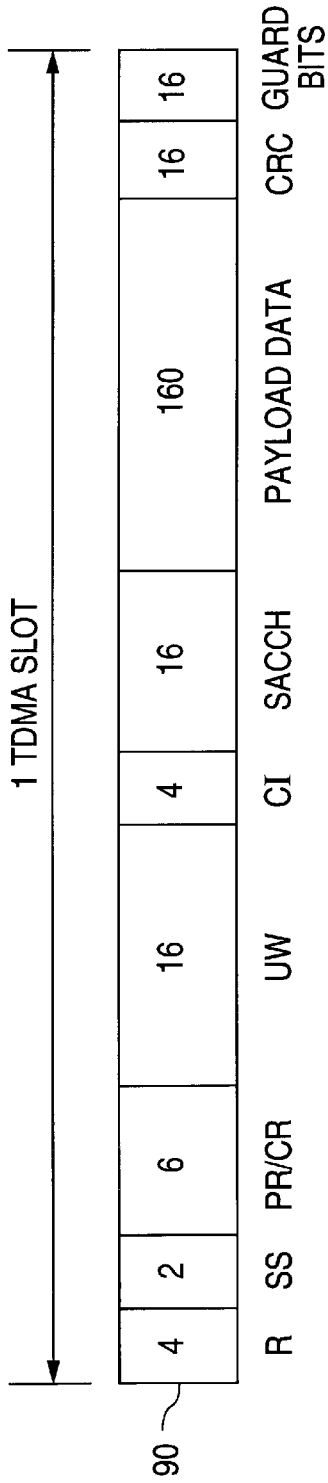
FIG. 4 depicts an exemplary protocol used for a slot in a preferred embodiment TDMA system transceiver.

FIG. 4 depicts an exemplary protocol 90 used in the preferred embodiment TDMA system transceiver. Protocol 90 is a communication protocol for communicating voice traffic.

Protocol 90 can be used for a single slot in a frame of a bursted signal. A frame is for a single frequency channel, and continually repeats while a TDMA system is on; other frequency channels would include identical frames. In the Personal Handy Phone System (PHS), a frame is 5 msec in duration, and each slot has an allocation of approximately 625 microseconds.

Figure 2:
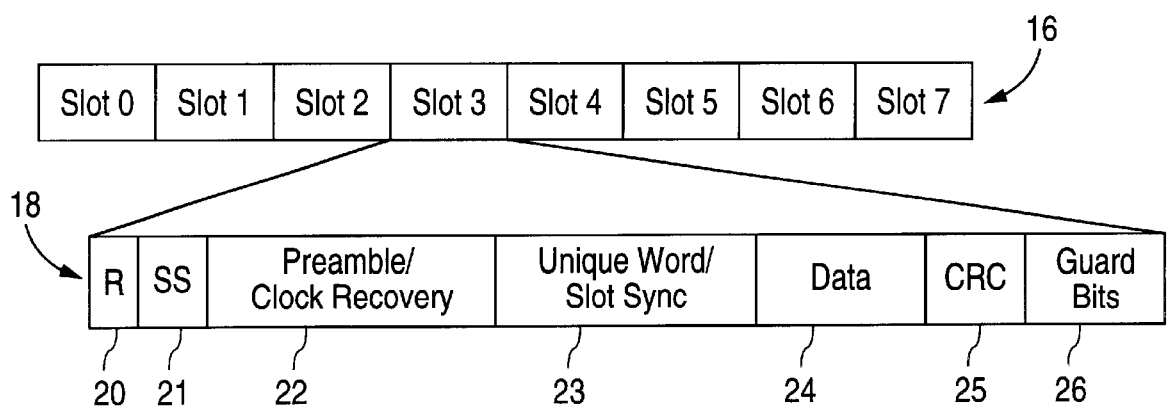
FIG. 2 illustrates a transmitted frame and slots on a single frequency channel in a conventional TDMA system.

As described with respect to FIGS. 1 and 2, a frame may comprise eight slots, such as slots 0–7. Each slot 0–7 represents a burst of information being transmitted from a portable station (e.g., wireless telephone) or by a base station. A first portable station using the frequency band may transmit on slot 0 of each frame and receive on a slot 4 of each frame. The second portable station using the frequency band may transmit on slot 1 of each frame and receive on slot 5. Similar allocations of slots 2, 3, 6 and 7 apply to third and fourth portable stations also actively interfacing with the base station of FIG. 1.

While a portable station is in an active mode, in which voice traffic is being communicated, the protocol (or format) of a slot resembles that of protocol 90. On the other hand, while a portable station is in some mode other than active mode, such as in a standby (paging) mode or initiating access to the TDMA system, the protocol (or format) of a slot may differ from that of protocol 90. For example, another protocol can be used for communicating non-voice (e.g., control) information.

Referring to FIG. 4, protocol 90 can include either a control channel for non-voice communication or a voice traffic channel. In protocol 90, a ramp-up (R) field is for ramping up a transceiver to the required power level for transmission. The R field may include four bits of information. A start symbol (SS) field, which may include two bits, marks the beginning of data within the slot. A preamble (PR) field, which may comprise a repeated, predefined six-bit code, can be used for clock recovery. A unique word (UW) field may comprise a sixteen-bit, fixed pattern for a marker sequence. This marker sequence can be correlated against a received pattern in order to synchronize a slot to be transmitted or received. As described below in more detail, the unique word can have one of four different patterns depending upon the current operating mode of transceiver 30. A channel identifier (CI) field defines the structure of a payload field, as described below in more detail. The CI field may comprise four bits. A slow associated control channel (SACCH) field contains sixteen bits of control information.

A payload data field may contain 160 bits of payload data, which can be in the form of adaptive-differential pulse code modulated (ADPCM) data. The payload data field is described below in more detail. A CRC field is provided for error detection and verification. The CRC field may also include sixteen bits. A guard bits field, which may also include sixteen bits, is provided to ensure that bits from consecutive slots do not overlap.

The payload data field of protocol 90 can contain several different types of logical channels. In one embodiment, these logical channel types can be an adaptive-differential pulse code modulated (ADPCM) traffic channel (TCH), a VOX channel (VOX), a fast associated control channel (FACCH), and two types of user specified packet channels (USPCH1 and USPCH2). Each type of logical channel can be defined by a specific bit pattern in the channel identifier field. Further, the payload data field of protocol 90 may carry any of three types of data: speech data, user packet data, and control data. Speech data is carried by the traffic channel (TCH) or VOX channel type of a payload field. Speech data is "real-time" data. As such, if a frame is missed or an error is detected within the TCH field, then the current payload data field is discarded and error mitigation is invoked, in which case, speech data from the previous frame is repeated. Control data and user packet data are carried in the FACCH, USPCH1, or USPCH2 logical channel types of a payload field. User packet data and control data are "non real-time" data, and as such, if these types of data are missed or corrupted, then an automatic retransmission request (ARQ) may be implemented to invoke the retransmission of the data.

In order to provide high quality sound for voice communication in a TDMA system, it is important to maximize the recovery of real-time speech data carried in a transmitted signal. Speech data is present in the TCH and VOX logical channels of the payload field in a TDMA burst. The TCH logical channel carries voiced ADPCM speech, so that if this channel is undetected, the perceived quality of speech at a transceiver will decline. Thus, it is desirable to recover the TCH channel if a frame is missed or corrupted. In contrast, a VOX logical channel contains no voiced speech, but only background noise. Accordingly, the perceived quality of speech at the transceiver is not adversely affected if this logical channel type is undetected.

The Personal Handy Phone System (PHS) utilizes four different unique words to achieve time synchronization in the TDMA system. In particular, two 32-bit unique words may be provided for control channel synchronization, and two 16-bit unique words may be provided for communication channel synchronization. For each channel type, one of the unique words is used for uplink (i.e., transmission from portable station to base station), and the other unique word is used for downlink (i.e., transmission from base station to portable station). The automatic unique word detection mechanism described herein works on all four unique words.

Micro-Sequencer

Figure 5:
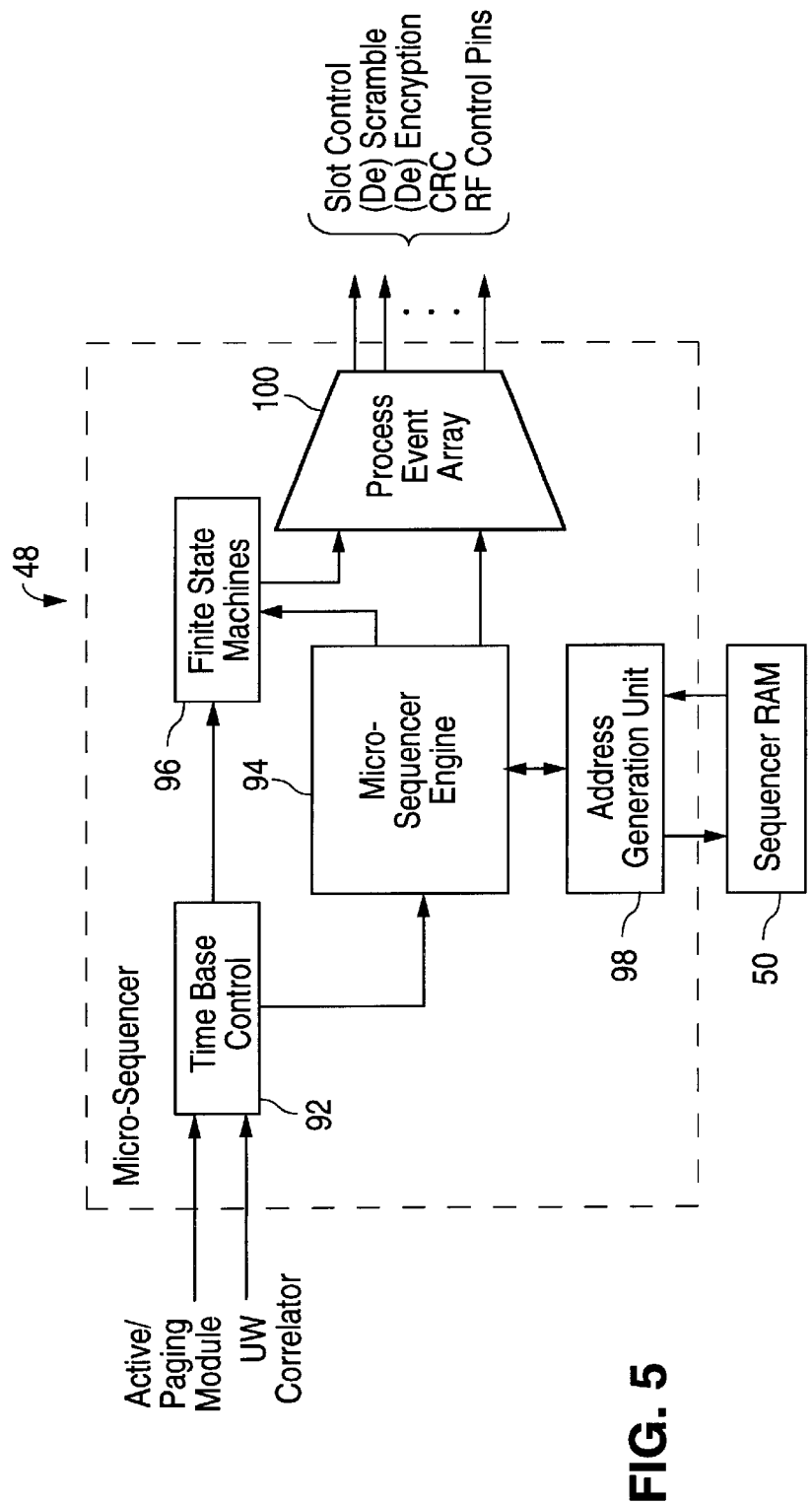
FIG. 5 shows additional details of a micro-sequencer used in a preferred embodiment.

FIG. 5 shows additional details of micro-sequencer 48 used in a preferred embodiment. As previously described, micro-sequencer 48 builds the slots for transmission/reception and the synchronization of the slot bits with the base station timing.

As shown in FIG. 5, micro-sequencer 48 includes a time base control 92 which outputs clock signals synchronized with the bit rate of a base station (e.g., base cell 14 in FIG. 1). Time-base control 92 receives the system clock signal output by active/paging module 72 (FIG. 3) and a signal from UW correlator module, described below. The synchronization of time base control 92 output may be performed in a conventional manner, for example, by synchronizing its output with the received preamble bits transmitted by the base station.

Time-base control 92 maintains an internal clock which can be used to recover voice data in a payload even when a marked sequence is not detected. In one embodiment, the internal clock may have a frequency of 384 Kbits/s. The time-base of the internal clock can be periodically synchronized with a base station so that transceiver 30 remains well-aligned with the base station for receiving signals therefrom. Accordingly, when the marker sequence of a TDMA signal slot is not detected, this internal clock can be referenced to support the recovery of payload data.

A micro-sequencer engine 94 and at least one finite state machine (FSM) 96 are coupled to time base control 92 and receive the clock signals output therefrom. Micro-sequencer engine 94 generally controls micro-sequencer 48. For example, microsequencer engine 94 provides enabling commands to FSMs 96.

FSMs 96 perform the function of building the protocols. Each of FSMs 96 can be implemented as a hardware state machine which provides a sequence of control codes synchronized with the bit rate clock output by time base control 92. Each FSM 96 comprises at least one logic circuit which may be formed of AND gates and OR gates interconnected so that the proper sequence of codes is generated. Typically, one or more signals generated by an FSM 96 is coupled back to an input node(s) of the same or a different FSM 96 to create the sequence of control codes.

Control codes in the re-timed output of micro-sequencer 48 enable and disable various devices and operations in the proper sequence and at the proper times to build a slot in the appropriate protocol, such as protocol 90 shown in FIG. 4. For example, the fixed codes in the ramp, start symbol, preamble, and unique word fields may be inserted into a slot at the proper times by enabling fixed parallel-to-serial storage devices containing those fixed codes. These storage devices can be located in sequencer RAM 50 in FIG. 3. To identify the desired mode of operation in order to signal to FSMs 96 which series of control codes should be output from micro-sequencer 48, micro-sequencer engine 94 is provided with a dynamic control architecture.

An address generation unit (AGU) 98 couples microsequencer engine 94 to sequencer RAM 50. Sequencer RAM 50 may contain a series of high-level commands or microcode instructions for providing instructions to microsequencer engine 94, which in turn provides instructions to the FSMs 96. Upon powering up of the TDMA transceiver, micro-sequencer 48 is reset by microcontroller 32 (FIG. 3), thereby allowing time for microcontroller 32 to load any suitable microcode in sequencer RAM 50. AGU 98 generates one or more data RAM addresses which may be enabled so that audio data for the voice field may be inserted into a slot.

A process event array 100 receives the control codes output by FSMs 96. Process event array 100 acts as a combiner and re-times the output of micro-sequencer 48. Process event array 100 outputs signals to a number of other components including slot control 52, scramble/descramble engine 54, encryption/de-encryption engine 56, CRC engine 58, UW correlator module 120, and RF control pins 84 (FIG. 3).

Modem

FIG. 6 provides additional details for modem 74 shown in FIG. 3. Modem 74, as described above, generally functions to modulate and demodulate various signals to and from TDMA transceiver 30. Accordingly, modem 74 includes a modulator 101 and a demodulator 102.

Modulator 101, as depicted, includes a read only memory (ROM) 103 supporting Q baseband signal generation, which is output to the I,Q digital analog converters (DACs) 76 for transmission out of transceiver 30 (FIG. 3).

Demodulator 102 includes a first multiplier 106 and a second multiplier 108, which are coupled to LPF 82. These multipliers 106 and 108 combine (mix) the signal from LPF module 82 with cosine (cos) and sine (sin) waveform signals, respectively. An arc-tan ROM 110 is coupled to multipliers 106 and 108 to receive the signals output therefrom. Arc-tan ROM 110 implements an "arc-tan" transfer function, as understood by those in the art. A multiplier 112 is coupled to arc-tan ROM 110 for receiving the signal output by arc-tan ROM 110. An automatic frequency control (AFC) 114, also coupled to multiplier 112, functions to control the frequency of internal time base maintained by time base control 92 (FIG. 5).

A clock recovery module 116 supports the recovery of a clock signal out of a data stream of a received signal. This can be accomplished by searching for and identifying the preamble/clock recovery (PR) field in a data stream. Clock recovery module 116 outputs a recovered clock signal for bit synchronization of TDMA transceiver 30. A data recovery module 118, coupled to multiplier 112 and clock recovery module 116, receives the data stream and the recovered clock signal. Data recovery module 118 uses the recovered clock signal to sample the data stream in order to recover data. Data recovery module 118 generates a signal which is input into BMC 44. Both data recovery and clock recovery techniques and circuit implementations therefor are well-known to those in the art.

A unique word (UW) correlator module 120 is coupled to data recovery module 118. UW correlator module 120, in conjunction with scramble/descramble engine 54 and encryption/de-encryption engine 56, and CRC engine 58 (FIG. 3), supports baseband processing. UW correlator module 120 receives the recovered data from data recovery module 118. UW correlator module 120 looks for a specific dotting pattern in the recovered data. Such a dotting pattern marks the beginning of the actual burst payload. If the dotting pattern is found, UW correlator module 120 sends a signal to micro-sequencer 48 to align the time-base control 92 (FIG. 5) contained therein. This allows TDMA transceiver 30 to establish slot alignment for the received signal.

UW correlator module 120 can be incorporated into a unique word correlators control loop which dynamically and automatically adjusts the number of errors allowed during correlation of the unique word. The number of allowable errors can be set based upon a various parameters which may include, but is not limited to, RSSI level, preamble detection, timebase status, CRC detection, channel type, communication burst type, and UW correlation result for the current frame or a previous frame. This provides flexibility and allows the TDMA system to adjust for changing environmental conditions.

Further, UW correlator module 120 supports a number of different "link-levels." Each link-level defines a respective window which provides a certain margin of error for the detection of a marker sequence or unique word in a received TDMA signal. In one embodiment, for example, seven link-levels may be provided, as described below in more detail.

Unique Word Correlators Control Loop

Figure 7:
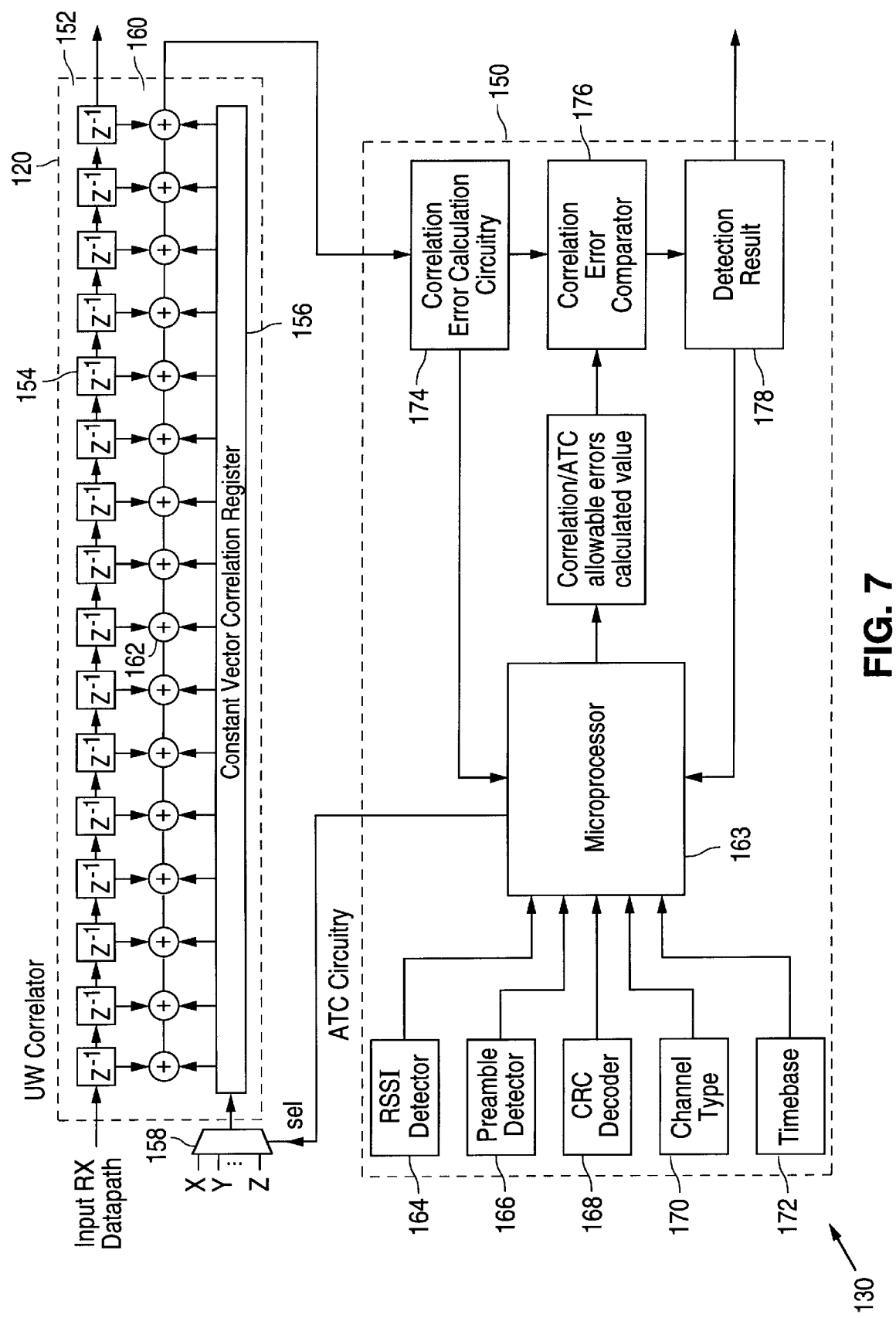
FIG. 7 shows details of a unique word (UW) correlator control loop used in a preferred embodiment.

FIG. 7 shows details of a unique word (UW) correlators control loop 130 used in a preferred embodiment. In general, UW correlators control loop 130 functions to control or adjust the number of errors allowed for various slots of a received signal during correlation of the unique word in the TDMA system. As shown, UW correlators control loop 130 incorporates UW correlator module 120 and automatic timing control (ATC) circuitry 150.

UW correlator module 120 generally functions to compare the bits within the unique word field of a bursted signal or slot against respective bits in a predefined sequence. That is, UW correlator module 120 correlates the bits within the unique word field of a slot against the bits of the predefined sequence. During this correlation, an error occurs when a bit in the unique word field does not match a respective bit in the predefined sequence. Nonetheless, some errors are allowed. With the present invention, the number of allowable errors can be changed in response to various parameters including, but not limited to, RSSI level, preamble detection, CRC detection, timebase status, channel type, communication burst type, and UW correlation result for the current frame or a previous frame, thereby allowing the TDMA system to adjust to changes in environmental conditions.

UW correlator module 120 includes a tap delay line 152. Tap delay line 152 receives and delays an input data stream. Tap delay line 152 comprises a series of delay elements 154. For clarity, only one of delay elements 154 is given a reference numeral. Each delay element 154 can store a bit of information. As such, tap delay line 152 can store the bits within a unique word field of a received slot.

A constant vector correlation register 156 may receive any one of a number of vectors (X,Y, . . . Z) from a multiplexer 158. Each of these vectors (X,Y, . . . Z) coincides with a separate predefined sequence for a unique word. With PHS, four different predefined sequences are provided for use as unique words; two of the sequences are associated with the control channel, and two are associated with the communication channel. The predefined sequences associated with the control channel may each comprises thirty-two (32) bits. The predefined sequences associated with the communication channel may each comprises sixteen (16) bits. For each channel type (communication or control), one of the unique words is used for uplink, and the other unique word is used for downlink. Constant vector correlation register 156 is operable to store one vector at a time. For this purpose, constant vector correlation register 156 may comprise a plurality of registers, each of which is operable to store one bit of a vector or unique word. In one embodiment, constant vector correlation register 156 can be formed with at least thirty-two one-bit registers, thereby providing the capability to contain both the 32-bit sequences for a control channel as well as the 16-bit sequences for a communication channel.

Correlation error detect circuitry 160 is coupled to tap delay line 152 and constant vector correlation register 156. Correlation error detect circuitry 160 generally functions to compare the bits within each of delay elements 154 (which can be the bits in the unique word field of a slot) against respective bits contained in constant vector correlation register 156 (which can be the bits of a predefined sequence).

As shown, correlation error detect circuitry 160 comprises a number of XOR operators 162. For clarity, only one of XOR operators 162 is given a reference numeral. Each XOR operator 162, which is coupled to a respective delay element 154 of tap delay line 152, generally functions to perform an exclusive OR operation between a bit contained in the respective delay element 154 and a corresponding bit in constant vector correlation register 156. For a given XOR operator 162, if a bit in the respective delay element 154 has the same value as a corresponding bit stored in a respective register of constant vector correlation register 156, that XOR operator 162 outputs a "0" or a low value, thus indicating that there is a match between such bits. On the other hand, if the bit within a delay element 162 does not have the same value as a corresponding bit stored in constant vector correlation register 156, then the XOR operator 162 outputs a "1" or a high value, thus indicating that there is no match between such bits.

ATC circuitry 150 is coupled to UW correlator module 120. ATC circuitry 150 generally functions to provide timing control for the TDMA receiver. ATC circuitry 150 includes a microprocessor 163 which is coupled to multiplexer 158. Coupled to microprocessor 163 are a received signal strength indicator (RSSI) detector 164, a preamble detector 166, a CRC decoder 168, a channel type detector 170, and a timebase module 172.

RSSI detector 164, preamble detector 166, CRC decoder 168, channel type detector 170, and timebase module 172, provide values for the parameters on which the number of allowable errors for UW correlation is adjusted. Specifically, RSSI detector 164 generally functions to detect and store a received signal strength indicator for at least the current frame and the immediately previous frame of an incoming signal. Preamble detector 166 is operable to determine and store the preamble for the current frame of the same signal. CRC decoder 168 is operable to store the CRC result of the previous frame. Channel type detector 170 is operable to determine the channel type of the incoming signal—i.e., channel type detector 170 is operable to distinguish between a control channel and a communications channel. Timebase module 172 generally functions to provide a timebase status for the ATC circuitry 150.

Microprocessor 163 generally may coordinate and manage the operation of ATC circuitry 150. Microprocessor 163 receives input from each of RSSI detector 164, preamble detector 166, CRC decoder 168, channel type detector 170, and timebase module 172. Using this input, microprocessor 163 calculates or derives a number of allowable errors for the current conditions. In addition, microprocessor 163 directs multiplexer 158 as to which vector X,Y, . . . Z is loaded into constant vector correlation register 156; this may be done in response to input from channel type detector 170. Microprocessor 163 can be implemented with any suitable processor.

Correlation error calculation circuitry 174 is coupled to UW correlator module 120 and microprocessor 163. For each correlation performed by UW correlator module 120, correlation error calculation circuitry 174 receives the "1"s and "1"s output by correlation error detect circuitry 160. Using this information, correlation error calculation circuitry 174 determines the actual number of errors (i.e., non-matches) occurring during the correlation. The number of actual errors is forwarded to microprocessor 163.

A correlation error comparator 176 is coupled to correlation error calculation circuitry 174 and microprocessor 163. Correlation error comparator 176 generally functions to compare the actual number of errors occurring during correlation (as calculated by correlation error calculation circuitry 174) against the calculated number of allowable errors (as determined by microprocessor 163). If the number of actual errors is less than the number of allowable errors, then correlation error comparator 176 outputs a unique word detection result 178 which triggers a re-alignment of the time base. Otherwise, if the number of actual errors is greater than the allowable number of errors, correlation error comparator 176 outputs a failed detection result 178 which does not cause a realignment the time base.

Link-Levels

Figure 8:
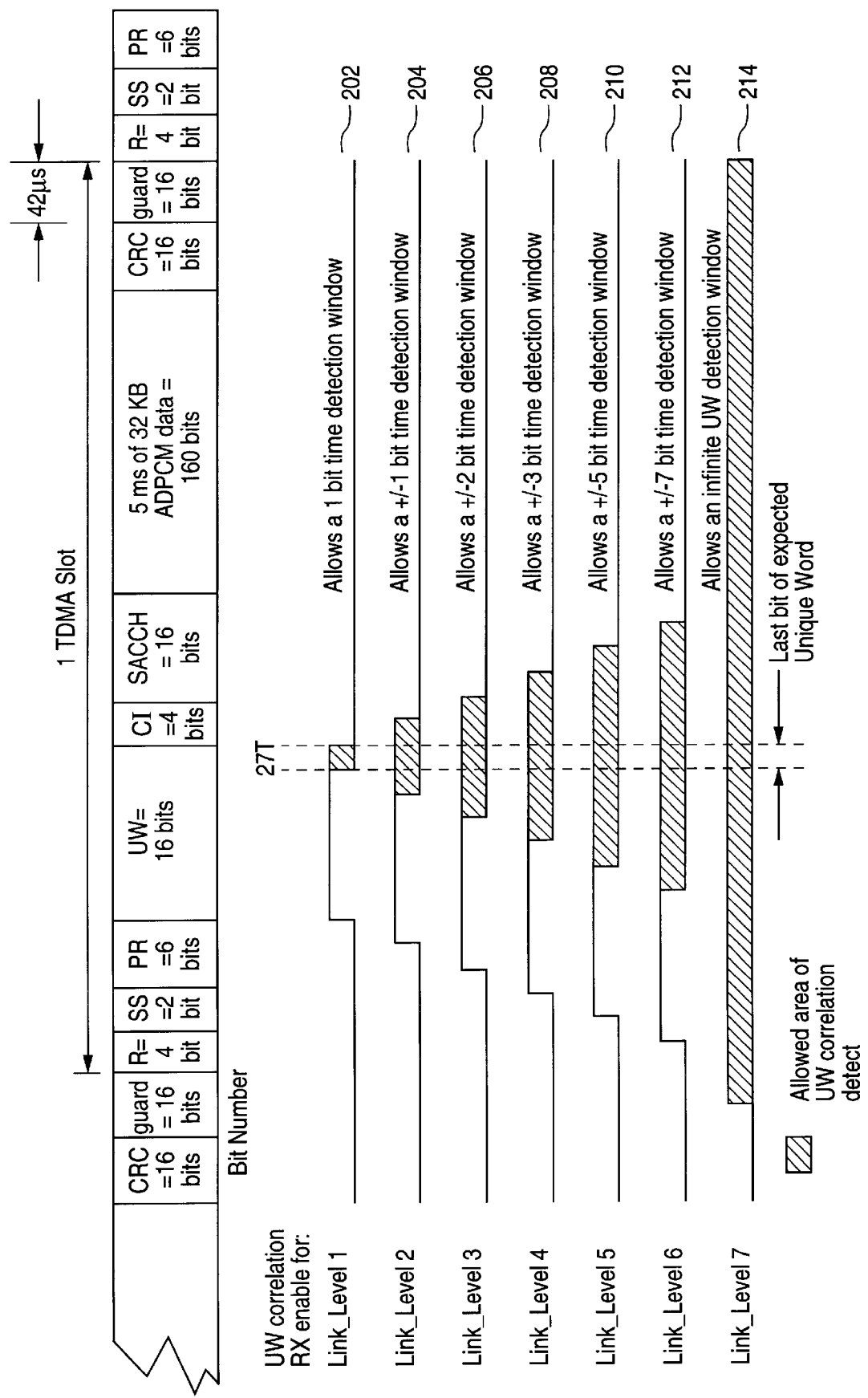
FIG. 8 illustrates a plurality of link levels.

FIG. 8 illustrates of a plurality of link-levels 202, 204, 206, 208, 210, 212, and 214. As shown, link-levels 202–214 are labeled as "link-level 1," "link-level 2," "link-level 3," "link-level 4," "link-level 5," "link-level 6," and "link-level 7," respectively.

Each link-level 202–214 defines a respective window. Collectively, these windows provide varying margins of error for the detection of the marker sequence or unique word in a received TDMA signal. The margins of error can be defined in increments of "bit time," where a bit time is the time required for the reception of a single bit of data in a signal.

Link level 202 defines a detection window with no margin for error—i.e., the marker sequence in a received signal will only be identified as such if the sequence appears exactly when it is expected. Link level 204 defines a detection window with a margin of error of +/−1 bit time—i.e., the marker sequence can be "off" from its expected time by one bit time (in either direction) and still be identified as the marker sequence. Similarly, link levels 206, 208, 210, and 212 define detection windows with margins of error of +/−2, +/−3, +/−5, and +/−7 bit times, respectively. Link level 214 defines a detection window having a margin of error of infinite length.

Link levels 202–214 greatly reduce the likelihood of false triggering of the unique word correlation and synchronization circuitry in a transceiver 30 (FIG. 3). In particular, the windows defined by link levels 202–214 are utilized in a UW window control algorithm, which may be performed or supported by UW correlator module 120 (FIG. 6). The UW window control algorithm can be initiated or invoked after transceiver 30 has been operating in a paging mode for a long period, during which a portable station 10–13 and a base station 14 (FIG. 1) fall out of synchronization.

In an exemplary operation, when a remote transceiver 30 (e.g., within a portable station) is initially powered up, the TDMA system within which transceiver 30 operates will initialize at link level 214. Link level 214 provides a window of infinite length during which the marker sequence (e.g., unique word) can be detected.

Upon detection of the marker sequence, transceiver 30 synchronizes to the last bit in the marker sequence. Once initial synchronization is established by a UW correlator module 120, transceiver 30 switches to a link level 202. Link level 202 provides a window with no margin of error for the detection of the last bit of the expected unique word in a slot. Any series of bits coincidentally matching the unique word but having a last bit which does not occur within the window does not trigger a false synchronization.

To allow for accumulated time-based disparity (e.g., due to changing propagation delays and inherent frequency drifts in circuitry) and the unpredictability created thereby, transceiver 30 may be automatically variably adjusted between link levels 204 through 212.

Selection of the appropriate link level 202–214 is determined, in part, by the amount of time that has elapsed without transceiver 30 looking for the synchronization code. For example, various paging or standby modes are defined to have certain predetermined elapsed times during which transceiver 30 will not attempting to synchronize. Link levels 202–214 are selected by a microprocessor algorithm to allow for time-based disparity. In particular, as the window size increases (indicating a greater unpredictability in the time that a slot is expected to begin), transceiver 30 must be enabled by the microprocessor algorithm to receive the slot at an earlier time to allow for the expected time disparity.

A more detailed description of a dynamic window for detecting a synchronization code (e.g., marker sequence) is provided in U.S. Pat. Nos. 5,598,419 and 5,668,813, both assigned to the present Assignee and incorporated herein by reference.

Operation

Figure 9:
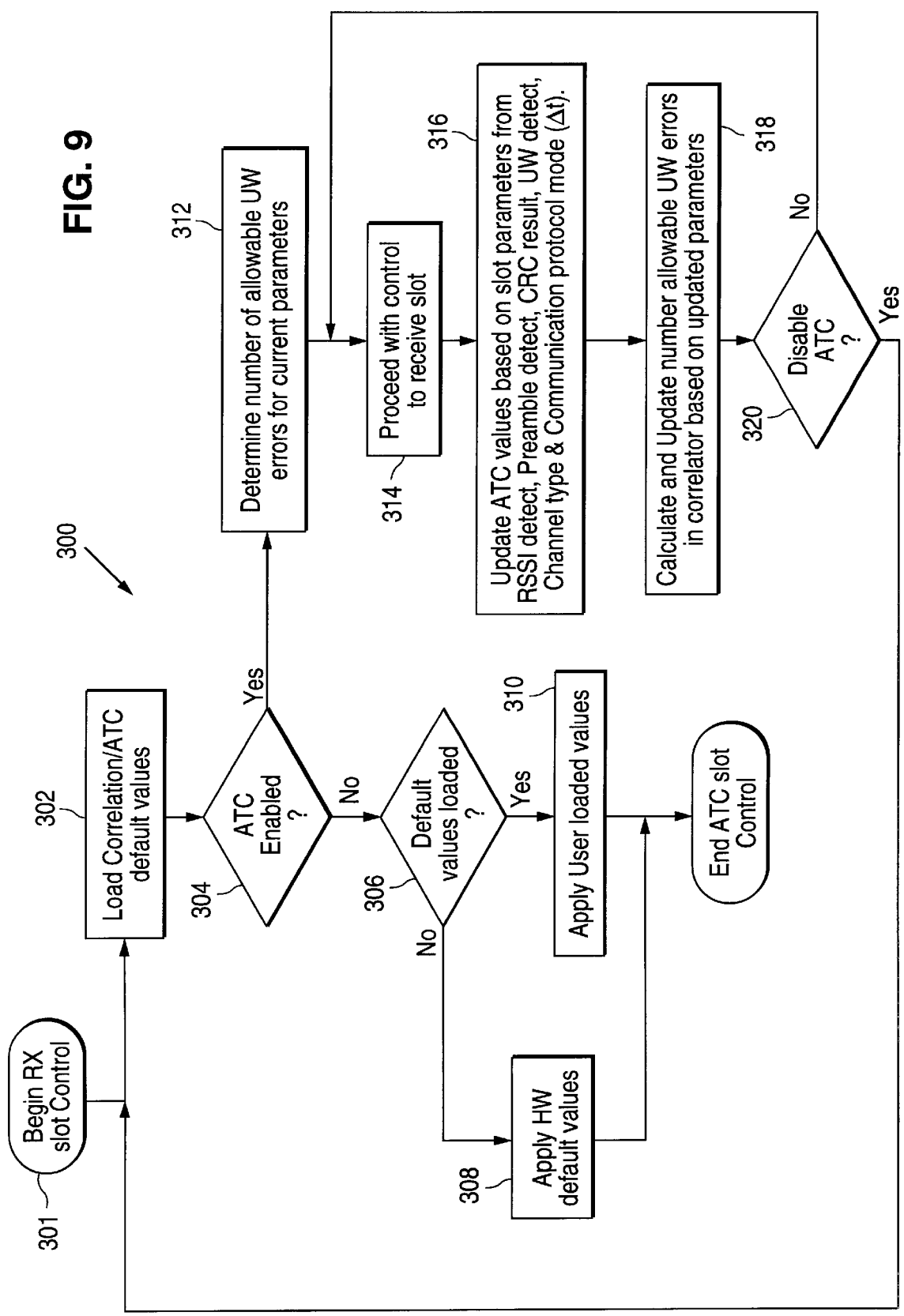
FIG. 9 is a flow diagram of a method for dynamically changing the number of allowable errors for unique word correlation, in accordance with a preferred embodiment of the present invention.

FIG. 9 is a flow diagram of a method 300 for dynamically changing the number of allowable errors for unique word correlation, in accordance with a preferred embodiment of the present invention. Method 300 may be performed by various elements of transceiver 30 (FIG. 3) on a bursted, receive data in (RDI) signal.

Method 300 begins at step 301 where micro-sequencer 48 of BMC 44 begins a receive (RX) slot control routine. This routine operates upon the RDI signal, which may be received at IF select 78. The slot control routine may operate on a bursted RDI signal on a slot-by-slot basis, and manages the reception and processing of the bursted signal in order to recover data, such as speech data, user packet data, or control data. This data may be contained within the payload data field of a suitable slot protocol, such as protocol 90 (FIG. 4).

At step 302, UW correlator module 120 and ATC circuitry 150 of UW correlators control loop 130 are loaded with default values for RSSI level, preamble detection, CRC result, timebase status, and channel type. These default values can be used to establish a default value for the number of allowable errors. Alternatively, UW correlators control loop 130 can be loaded with the default value for the number of allowable errors.

At step 304, micro-sequencer 48 determines whether ATC circuitry 150 is enabled. If ATC circuitry 150 is not enabled, UW correlators control loop 130 does not function, and accordingly, the number of allowable errors for unique word correlation is not dynamically adjusted. Default values, which can be either hard-wired or loaded by a user, are used for correlation. Method 300 proceeds to step 306 where micro-processor 163 of ATC circuitry 150 determines whether default values have been loaded into ATC circuitry 150 by a user. If it is determined that default values have not been loaded, then at step 308 hard-wire default values are applied, after which the slot control routine and method 300 end. Otherwise, if it is determined at step 306 that default values have been loaded, then micro-processor 163 of ATC circuitry 150 applies such user-loaded default values at step 310. Afterwards, method 300 ends.

Referring again to step 304, if it is determined that ATC circuitry 150 is enabled, then UW correlators control loop 130 functions to automatically and dynamically adjust or change the number of allowable errors for unique word correlation. Micro-processor 163 receives inputs from RSSI detector 164, preamble detector 166, CRC decoder 168, channel type module 170, and timebase module 172. These inputs give current and/or previous values for various parameters including RSSI level, preamble detection, CRC result, timebase status, and channel type for the current frame or a previous frame. At step 312, micro-processor 163 determines the number of allowable errors for the current values of the various parameters.

At step 314, the slot control routine proceeds to receive a slot in the bursted RDI signal. This slot is processed in part at UW correlators control loop 130. Each of RSSI detector 164, preamble detector 166, CRC decoder 168, channel type module 170, and UW correlator module 120 process the slot to determine slot-specific values for respective parameters. These values are input into micro-processor 163. At step 316, micro-processor 163 updates the values within ATC circuitry 150 based upon input from RSSI detector 164, preamble detector 166, CRC decoder 168, channel type module 170, and UW correlator module 120.

At step 318, micro-processor 163 calculates and updates the number of allowable errors for UW correlation based upon the updated parameters. Micro-processor 163 outputs a detection result.

At step 320, micro-processor 163 determines whether ATC circuitry 150 has been disabled. If not, method 300 returns to step 314 where the slot control routine proceeds to receive the next slot. Steps 314 through 320 are repeated until ATC circuitry 150 is disabled. In each iteration of steps 314–320, new values for the RSSI, preamble, CRC, and channel type parameters are provided, and the number of allowable errors is re-calculated. Accordingly, UW correlators control loop 130 continuously adjusts and changes the number of allowable errors, thereby accounting for changing conditions, such as environmental conditions. This improves the quality of voice communication in the TDMA system.

When it is determined at step 320 that ATC circuitry 150 is disabled, method 300 moves to step 302 where default values are loaded into UW correlation module 120 and ATC circuitry 150 of UW correlation control loop 130. Method 300 ends when the ATC circuitry 150 is disabled and either hard-wired default values or user loaded values are applied and the slot control routine is ended.

This disclosure primarily focuses on those non-conventional features of a TDMA transceiver. Those circuits typically used in TDMA transceivers which have not been described in detail may generally be conventional circuits using conventional algorithms. The embodiments described herein may be implemented in any TDMA system, although the examples here are generally directed to the Personal Handy Phone System (PHS).

While particular embodiments of the present invention have been shown and described, it will be obvious to those skilled in the art that changes and modifications may be made without departing from this invention in its broader aspects and, therefore, the appending claims are to encompass within their scope all such changes and modifications as fall within the true spirit and scope of this invention.

What is claimed is:

1. A system comprising:
   a unique word correlator module operable to correlate a unique word field in a burst of a time division multiple access (TDMA) signal against a predefined sequence; and
   automatic timing control circuitry coupled to the unique word correlator module, the automatic timing control circuitry operable to derive a number of errors that are allowable during correlation of the unique word field, wherein the automatic timing control circuitry comprises correlation error calculation circuitry operable to determine the actual number of errors occurring during correlation of the unique word field.

2. A system comprising:
   a unique word correlator module operable to correlate a unique word field in a burst of a time division multiple access (TDMA) signal against a predefined sequence; and p1 automatic timing control circuitry coupled to the unique word correlator module, the automatic timing control circuitry operable to derive a number of errors that are allowable during correlation of the unique word field, wherein the automatic timing control circuitry comprises a correlation error comparator operable to compare the derived number of allowable errors against an actual number of errors occurring during correlation of the unique word field.

3. A system comprising:
   a unique word correlator module operable to correlate a unique word field in a burst of a time division multiple access (TDMA) signal against a predetermined sequence, wherein the unique word correlator module is operable to support a dynamic window within which the unique word field is allowably detected; and
   automatic timing control circuitry coupled to the unique word correlator module, the automatic timing control circuitry operable to derive a number of errors that are allowable during correlation of the unique word field.

4. A system comprising:
   a unique word correlator module operable to correlate a unique word field in a burst of a time division multiple access (TDMA) signal against a predefined sequence; and
   automatic timing control circuitry coupled to the unique word correlator module, the automatic timing control circuitry operable to derive a number of errors that are allowable during correlation of the unique word field, wherein the automatic timing control circuitry is operable to use a current value for at least one parameter to derive the number of allowable errors.

5. The system of claim 4 wherein the at least one parameter is a parameter from the group comprising received signal strength indicator level, preamble detection, CRC result, timebase status, and channel type for the TDMA signal.

6. A method comprising:
   receiving a burst of a time division multiple access (TDMA) signal, the burst having a unique word field;
   correlation the unique word field against a predefined sequence;
   deriving a number of errors that are allowable during correlation of the unique word field; and
   comparing the derived number of allowable errors against an actual number of errors occurring during correlation of the unique word field.

7. A method comprising:
   receiving a burst of a time division multiple access (TDMA) signal, the burst having a unique word field;
   correlation the unique word field against a predefined sequence; and
   deriving a number of errors that are allowable during correlation of the unique word field, wherein deriving comprises using a current value for at least one parameter to derive the number of allowable errors.

8. The method of claim 7 wherein the at least one parameter is a parameter from the group comprising received signal strength indicator level, preamble detection, CRC result, timebase status, and channel type for the burst of the TDMA signal.

* * * * *